US012657452B2

(12) United States Patent
Cohen et al.

(10) Patent No.: US 12,657,452 B2
(45) Date of Patent: Jun. 16, 2026

(54) TRAINING AND DEPLOYMENT OF MACHINE LEARNING MODELS

(71) Applicant: NVIDIA Corporation, Santa Clara, CA (US)

(72) Inventors: Jonathan Michael Cohen, San Jose, CA (US); Ryan Edward Leary, Woodstock, GA (US); Scot Duane Junkin, Kirkland, WA (US); Purnendu Mukherjee, San Jose, CA (US); Joao Felipe Santos, Montreal (CA); Tomasz Kornuta, Los Gatos, CA (US); Varun Praveen, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1133 days.

(21) Appl. No.: 17/248,906

(22) Filed: Feb. 12, 2021

(65) Prior Publication Data

US 2022/0261631 A1 Aug. 18, 2022

(51) Int. Cl.
| | |
|---|---|
| *G06N 3/08* | (2023.01) |
| *G06F 18/214* | (2023.01) |
| *G06N 3/04* | (2023.01) |
| *G06N 3/063* | (2023.01) |
| *G10L 17/18* | (2013.01) |

(52) U.S. Cl.
CPC ............. *G06N 3/08* (2013.01); *G06F 18/214* (2023.01); *G06N 3/04* (2013.01); *G06N 3/063* (2013.01); *G10L 17/18* (2013.01)

(58) Field of Classification Search
CPC ............ G06N 3/08; G06N 3/04; G06N 3/063; G06N 20/00; G06F 18/214; G10L 17/18; G10L 13/02; G10L 15/16
See application file for complete search history.

(56) References Cited

U.S. PATENT DOCUMENTS

| | | | | |
|---|---|---|---|---|
| 11,281,975 B1* | 3/2022 | Isaksson | ............. | G06F 11/3664 |
| 2011/0161972 A1* | 6/2011 | Dillenberger | ............. | G06F 9/52 |
| | | | | 718/104 |
| 2013/0080761 A1* | 3/2013 | Garrett | ................ | G06F 11/3428 |
| | | | | 713/100 |
| 2018/0025289 A1* | 1/2018 | Doshi | .................... | G06N 20/00 |
| | | | | 706/12 |
| 2018/0089591 A1* | 3/2018 | Zeiler | ..................... | G06F 3/048 |
| 2019/0034172 A1* | 1/2019 | Kostello | ................... | G06F 8/20 |
| 2019/0155633 A1* | 5/2019 | Faulhaber, Jr. | .......... | G06N 5/04 |
| 2019/0272002 A1* | 9/2019 | Seenappa | ................ | G06F 1/324 |
| 2019/0317885 A1* | 10/2019 | Heinecke | ........... | G06F 11/3698 |
| 2019/0377606 A1* | 12/2019 | Feng | ..................... | G06F 9/5044 |
| 2020/0042419 A1* | 2/2020 | Wei | ..................... | G06F 11/3428 |

(Continued)

FOREIGN PATENT DOCUMENTS

| | | |
|---|---|---|
| CN | 108881446 A | 11/2018 |
| CN | 109272119 A | 1/2019 |

OTHER PUBLICATIONS

Office Action for Chinese Patent Application No. 202210023098.7, mailed May 17, 2025, 17 Pages.

*Primary Examiner* — Phenuel S Salomon

(74) *Attorney, Agent, or Firm* — Lowenstein Sandler LLP

(57) ABSTRACT

Apparatuses, systems, and techniques to provisioning of pipelines for efficient training, retraining, configuring, deploying, and using machine learning models for inference in user-specific platforms.

23 Claims, 10 Drawing Sheets

(56)         References Cited

U.S. PATENT DOCUMENTS

| | | | |
|---|---|---|---|
| 2020/0118039 A1* | 4/2020 | Kocberber | G06N 5/01 |
| 2020/0150953 A1* | 5/2020 | Smith | G06F 8/75 |
| 2021/0012212 A1 | 1/2021 | Sikka et al. | |
| 2021/0019665 A1 | 1/2021 | Gur et al. | |
| 2021/0312905 A1* | 10/2021 | Zhao | G10L 15/16 |

* cited by examiner

400 ⟍

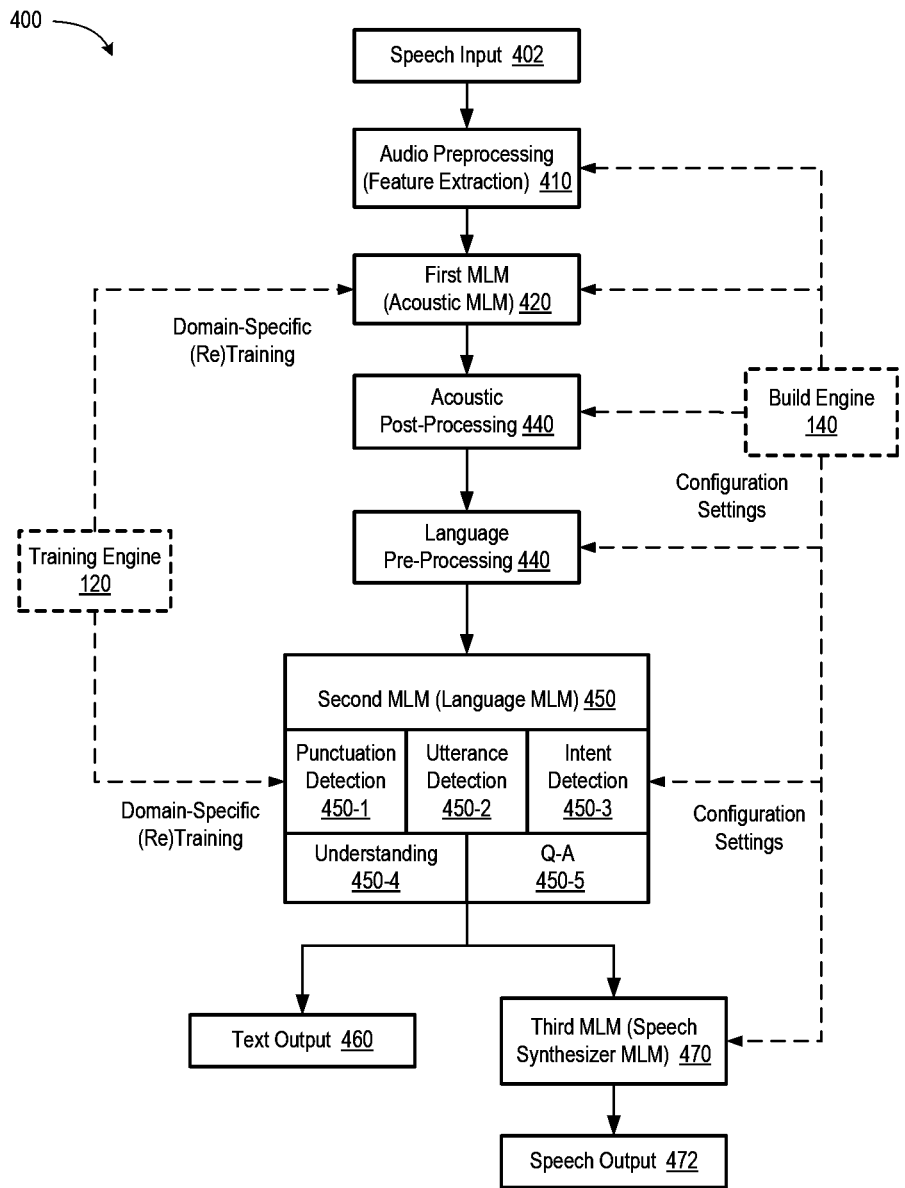

Speech Input 402

Audio Preprocessing
(Feature Extraction) 410

First MLM
(Acoustic MLM) 420

Domain-Specific
(Re)Training

Acoustic
Post-Processing 440

Build Engine
140

Configuration
Settings

Training Engine
120

Language
Pre-Processing 440

Second MLM (Language MLM) 450

| Punctuation Detection 450-1 | Utterance Detection 450-2 | Intent Detection 450-3 |
|---|---|---|
| Understanding 450-4 | | Q-A 450-5 |

Domain-Specific
(Re)Training

Configuration
Settings

Text Output 460

Third MLM (Speech
Synthesizer MLM) 470

Speech Output 472

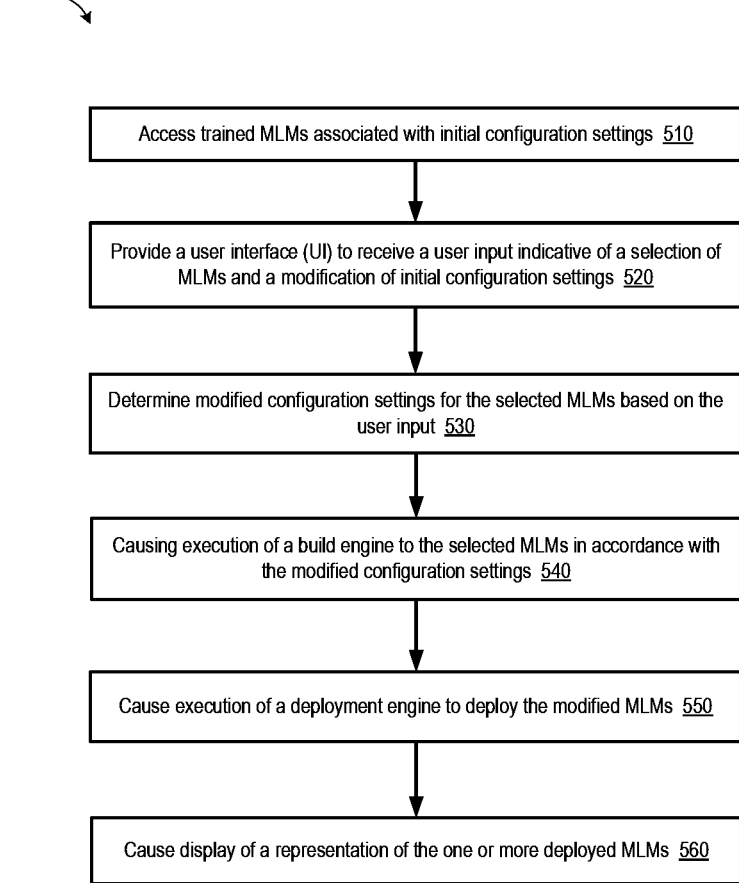

Access trained MLMs associated with initial configuration settings  510

Provide a user interface (UI) to receive a user input indicative of a selection of MLMs and a modification of initial configuration settings  520

Determine modified configuration settings for the selected MLMs based on the user input  530

Causing execution of a build engine to the selected MLMs in accordance with the modified configuration settings  540

Cause execution of a deployment engine to deploy the modified MLMs  550

Cause display of a representation of the one or more deployed MLMs  560

FIG. 5

600
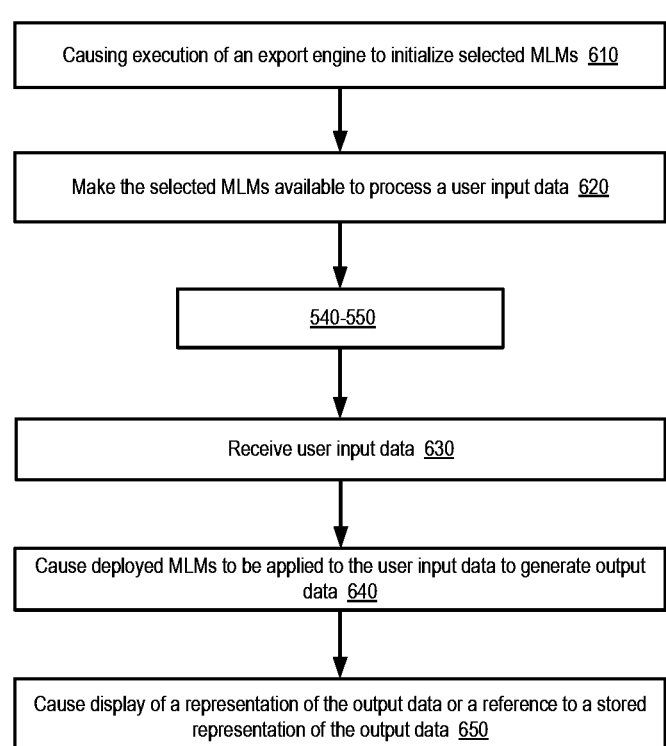
Causing execution of an export engine to initialize selected MLMs  610
Make the selected MLMs available to process a user input data  620
540-550
Receive user input data  630
Cause deployed MLMs to be applied to the user input data to generate output data  640
Cause display of a representation of the output data or a reference to a stored representation of the output data  650
FIG. 6

TRAINING AND DEPLOYMENT OF MACHINE LEARNING MODELS

TECHNICAL FIELD

At least one embodiment pertains to processing resources used to perform and facilitate artificial intelligence. For example, at least one embodiment pertains to provisioning of pipelines for efficient training, configuring, deploying, and using machine learning models in user-specific platforms.

BACKGROUND

Machine learning is often used in office and hospital environments, robotic automation, security applications, autonomous transportation, law enforcement, and many other settings. In particular, machine learning has applications in audio and video processing, such as in voice, speech, and object recognition. One popular approach to machine learning involves training a computing system using training data (sounds, images, and/or other data) to identify patterns in the data that may facilitate data classification, such as the presence of a particular type of an object within a training image or a particular word within a training speech. Training can be supervised or unsupervised. Machine learning models can use various computational algorithms, such as decision tree algorithms (or other rule-based algorithms), artificial neural networks, and the like. During a subsequent deployment stage—also called an "inference stage"—new data is input into a trained machine learning model and various target objects, sounds, or sentences of interest can be identified using patterns and features established during training.

BRIEF DESCRIPTION OF DRAWINGS

FIG. 4 is a block diagram of an example customizable pipeline that uses one or more machine learning models for natural language processing of speech, in accordance with at least some embodiments;

FIG. 5 is a flow diagram of an example method of providing a customizable pipeline that support training, configuring, and deploying of one or more machine learning models, in accordance with at least some embodiments;

FIG. 6 is a flow diagram of an example method of using a deployed customizable machine pipeline machine learning models, in accordance with at least some embodiments;

DETAILED DESCRIPTION

Figure 1:
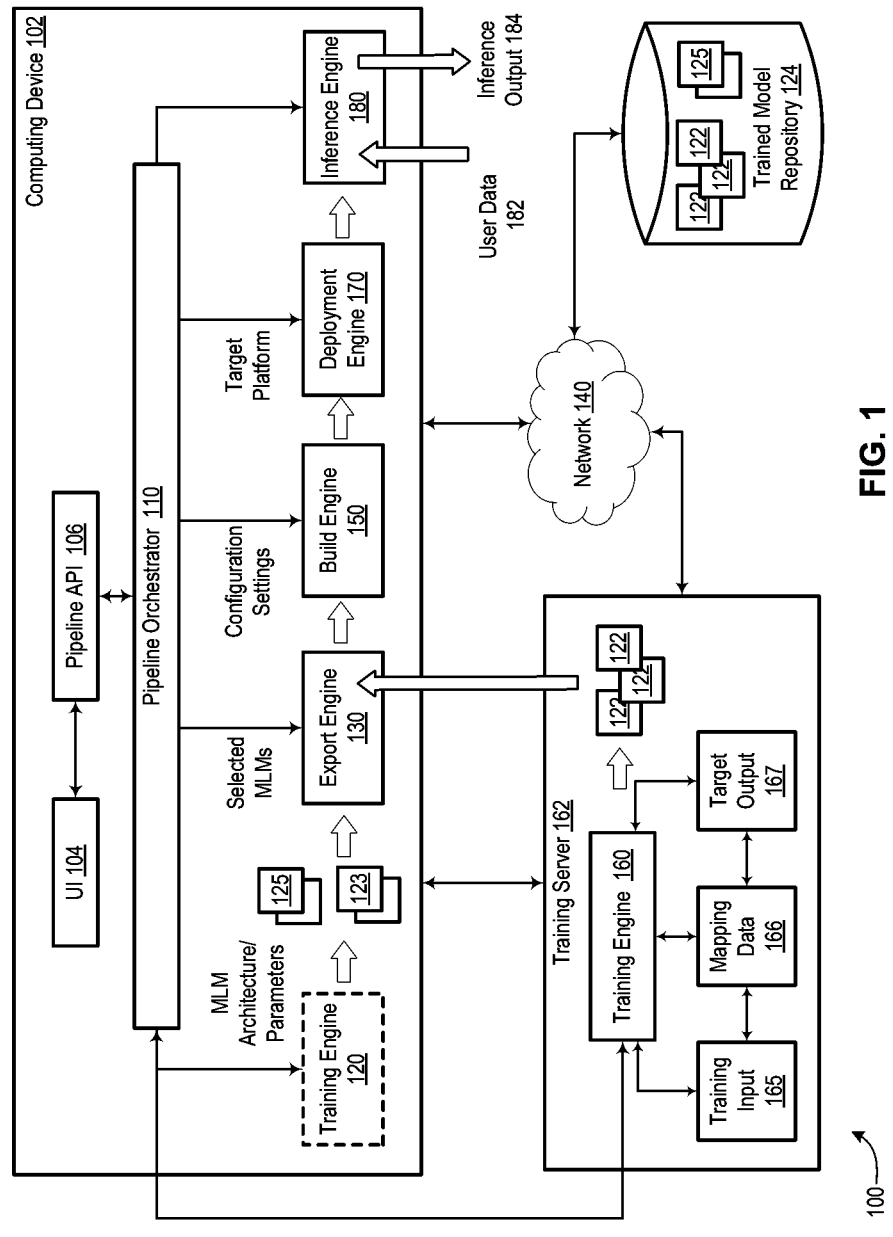
FIG. 1 is a block diagram of an example architecture of customizable pipeline that supports training, configuring, and deploying of one or more machine learning models, in accordance with at least some embodiments.

Machine learning has become a staple in a multitude of industries and activities where at least some levels of decision-making can be delegated to computer systems. Presently, machine learning models (MLMs) are developed for specific target domains and applications. Since the objectives of various machine learning applications may be very diverse, MLMs may need to be set up, configured, and trained differently depending on the intended user of the trained MLMs. Models belonging to the same general type, e.g., speech recognition models, may nonetheless be set up very differently in different use cases. For example, speech recognition models designed for automated customer phone support may be different from models developed for hospital applications, e.g., for recording narratives of doctors analyzing diagnostic data of a patient or responding to patient requests. Moreover, even MLMs that operate in the same target domain (e.g., medical field), may have to be configured differently in different contexts. For example, a model designed for recognizing speech in an operating room may have to be trained or configured differently than a model designed for an observation or recovery ward.

Presently, configuring a MLM for applications in a user-specific domain may require significant development efforts. Developers of a MLM may need to design an architecture of the model (e.g., a number of layers and a topology of node connections, in case of a neural network MLM), train the MLM(s) on relevant domain-specific training data, and so on. In many instances, the MLM(s) may be just one part of a larger code that involves various additional support stages of computations, e.g., sound pre-processing, sound artifact removal, filtering, post-processing, spectral Fourier analysis, and the like. Multiple MLMs may be present in the same computational pipeline and the developer may have to incorporate multiple MLMs, each of which provide distinct functionalities, into a single computational pipeline. For example, a developer of a natural language processing application may have to integrate feature extraction (that uses spectral analysis), an acoustic MLM (that processes extracted features), acoustic post-processing module (that removes artifact, filler and stop words, etc.), language pre-processing (that performs word tokenization, lemmatization, etc.), a language MLM (that identifies a topic, speaker's intent, punctuation of speech, etc.), language post-processing (to perform rule-based correction/verification of language MLM outputs), and so on. In such a pipeline, an output of an acoustic MLM may be input into a language MLM, which may further input data into an intent-identification model, and so on.

Presently, to integrate one or more MLMs with various support stages into a single computational pipeline or workflow, a developer has to create and manage a code that encompasses the entire workflow. For example, a developer may create a platform-specific code, such as a speech recognition MLM pipeline customized to meet the needs of a medical clinic. Such codes can make it cumbersome and technically challenging to share and scale MLM applications outside the original use case. In particular, such pipelines may not be easily customizable to other domains or computer platforms. Specifically, another developer trying to reconfigure the MLMs of the pipeline to a different domain (e.g., from a stock trading company to an investment brokerage firm) may not only have to reconfigure the actual MLMs, but may also need to re-engineer and overhaul much of the entire code even though some of the parts of the code may implement one or more standard modules of the pipeline (e.g., digital sound signal preprocessing). As a result, a user (e.g., a customer) who has access to the MLM pipeline but lacks advanced developer's expertise may be unable to customize the pipeline to the user's specific needs, e.g., to reconfigure a natural language programming MLM pipeline for use in a different linguistic domain of interest to the user (e.g., sports broadcasting). The user may, therefore, have to use the MLM pipeline that is sub-optimal in meeting the user's objectives. Alternatively, the user may have to incur additional resources and hire professional developers to configure the pipeline and, possibly, retrain some or all of the MLMs of the pipeline.

Aspects and embodiments of the present disclosure address these and other challenges of the modern technology by describing methods and systems that enable efficient managing and configuring of MLM pipelines. Implementations allow training and retraining of MLMs for user-specific target platforms, changing parameters and architecture of previously trained MLMs, selecting and configuring previously trained MLMs, adapting selected MLMs to serve user-specific needs, integrating selected MLMs into further customizable workflows, deploying the customized workflows on user and cloud hardware, inputting actual inference data, reading, storing, and managing inference outputs, and so on.

System Architecture

FIG. 1 is a block diagram of an example architecture of customizable pipeline (CP) 100 that supports training, configuring, and deploying of one or more machine learning models, in accordance with at least some embodiments. As depicted in FIG. 1, a CP 100 may be implemented on a computing device 102, but it should be understood that any engines and components of computing device 102 may be implemented on (or shared among) any number of computing devices or on a cloud. Computing device 102 may be a desktop computer, a laptop computer, a smartphone, a tablet computer, a server, a computing device that accesses a remote server, a computing device that utilizes a virtualized computing environment, a gaming console, a wearable computer, a smart TV, and so on. A user of CP 100 may have a local or remote (e.g., over a network) access to computing device 102. Computing device 102 may have (not shown in FIG. 1) any number of central processing units (CPUs) and graphical processing units (GPUs), including virtual CPUs and/or virtual GPUs, or any other suitable processing devices capable of performing the techniques described herein. Computing device 102 may further have (not shown in FIG. 1) any number of memory devices, network controllers, peripheral devices, and the like. Peripheral devices may include cameras (e.g., video cameras) for capturing images (or sequences of images), microphones for capturing sounds, scanners, sensors, or any other devices for data intake.

In some embodiments, a CP 100 may include a number of engines and components for efficient MLM implementation. A user (customer, end user, developer, data scientist, etc.) may interact with CP 100 via a user interface UI 104, which may include a command line, a graphical UI, a web-based interface (e.g., a web-browser accessible interface), a mobile application-based UI, or any combination thereof. UI 104 may display menus, tables, graphs, flowcharts, graphical and/or textual representations of software, data, and workflows. UI 104 may include selectable items, which may enable the user to enter various pipeline settings, provide training/retraining and other data, as described in more detail below. User actions entered via UI 104 may be communicated to a pipeline orchestrator 110 of CP 100 via a pipeline API 106. In some embodiments, prior to receiving pipeline data from pipeline orchestrator 110, the user (or the remote computing device that the user is using to access the pipeline) may download an API package to the remote computing device. The downloaded API package may be used to install pipeline API 106 on the remote computing device to enable the user to have a two-way communication with pipeline orchestrator 110 during setting up and using CP 100.

Pipeline orchestrator 110, via pipeline API 106, may provide the user with various data that may be used in configuring and deploying one or more MLMs and using the deployed MLMs for processing (inferencing) of various input user data. For example, pipeline orchestrator 110 may provide the user with information about available pre-trained MLMs, may enable retraining of pre-trained MLMs on user-specific data provided by the user or training of new (previously untrained) MLMs. Pipeline orchestrator 110 may then build CP 100 based on the information received from the user. For example, pipeline orchestrator 110 may configure user-selected MLMs and deploy the selected MLMs together with various other (e.g., pre- and post-processing) stages that are used in implementing the selected MLMs. To perform these and other tasks, pipeline orchestrator 110 may coordinate and manage a number of engines, each engine implementing a part of the overall pipeline functionality.

In some embodiments, CP 100 may have access to one or more previously trained (pre-trained) MLMs and may, therefore, provide the user with access to at least some (e.g., based on the user's subscription) of these pre-trained MLMs. The MLMs may be trained for common tasks in the area of the CP specialization. For example, a CP that is specialized in speech processing may have access to one or more MLMs trained to recognize some typical speech, such as customer service requests, common conversations, and the like. CP 100 may further include a training engine 120. Training engine 120 may implement retraining (additional training) of the pre-trained MLMs. Retraining may be performed using retraining data tailored for a user-specific domain of use. In some embodiments, the retraining data may be provided by the user. For example, a user may provide retraining data to enhance natural language processing capabilities of one of the pre-trained MLMs to improve recognition of speech that may be encountered in an investment brokerage environment or a securities trading environment. The data may be provided (e.g., by a technology specialist at the user's financial company) in the form of audio digital recordings in any available (compressed or uncompressed) digital format, e.g., WAV, WavPack, WMA, MP3, MPEG-4, as a sound track of a video recording, a TV program, and the like.

Pre-trained MLMs 122 may be stored in a trained model repository 124, which may be accessible to computing device 102 over a network 140. Pre-trained MLMs 122 may be trained by a training server 162. Network 140 may be a public network (e.g., the Internet), a private network (e.g., a local area network (LAN), or wide area network (WAN)), a wireless network, a personal area network (PAN), or a combination thereof. In some embodiments, training server 162 may be a part of computing device 102. In other embodiments, training server 162 may be communicatively coupled to computing device 102 directly or via network 140. Training server 162 may be (and/or include) a rack-mount server, a router computer, a personal computer, a laptop computer, a tablet computer, a desktop computer, a media center, or any combination thereof. Training server 162 may include a training engine 160. The training engine 160 on training server 162 may be the same as (or similar to) training server 162 on computing device 102. In some embodiments, training engine 120 on computing device 102 may be absent; instead, all training and retraining may be performed by training engine 160 on training server 162. In some embodiments, training engine 160 may perform off-site training of pre-trained MLMs 122 whereas training engine 120 on computing device 102 may perform retraining of pre-trained MLMs 122 as well as training of new (custom) MLMs 125.

During training or retraining, training engine 160 (120) may generate and configure one or more MLMs. MLMs may include regression algorithms, decision trees, support vector machines, K-means clustering models, neural networks, or any other machine learning algorithms. Neural network MLMs may include convolutional, recurrent, fully connected, Long Short Term Memory models, Hopfield, Boltzmann, or any other types of neural networks. Generating MLMs may include setting up an MLM type (e.g., a neural network), architecture, a number of layers of neurons, types of connections between the layers (e.g., fully connected, convolutional, deconvolutional, etc.), the number of nodes within each layer, types of activation functions used in various layers/nodes of the network, types of loss functions used in training of the network, and so on. Generating MLMs may include setting (e.g., randomly) initial parameters (weights, biases) of various nodes of the networks. The generated MLMs may be trained by training engine 160 using training data that may include training input(s) 165 and corresponding target output(s) 167.

For example, for training of speech recognition MLMs 122, training inputs 165 may include one or more digital sound recordings with utterances of words, phrases, and/or sentences that the MLM is being trained to recognize. Target outputs 167 may include indications of whether the target words and phrases are present in the training inputs 165. Target outputs 167 may also include transcriptions of the utterances, and so on. In some embodiments, target outputs 167 may include identification of a speaker's intent. For example, a customer calling a food delivery service may express a limited number of intentions (to order food, to check on the status of the order, to cancel the order, etc.) but may do so in a practically unlimited number of ways. Whereas specific words and sentences uttered may not be of much significance, determination of the intent may be important. Accordingly, in such embodiments, target outputs 167 may include a correct category of intent Similarly, a target output 167 for a training input 165 that includes an utterance of a client calling a customer service phone may be both a transcription of the utterance as well as an indication of an emotional state of the client (e.g., angry, worried, satisfied, etc.). Additionally, training engine 160 may generate mapping data 166 (e.g., metadata) that associates training input(s) 165 with correct target output(s) 167. During training of MLMs 122 (or custom MLMs 125), training engine 160 (or 120) may identify patterns in training input(s) 165 based on desired target output(s) 167 and train the respective MLMs to perform desired tasks. Predictive utility of the identified patterns may subsequently be verified using additional training input/target output associations before being used, during inference stage, in future processing of new speeches. For example, upon receiving a new voice message, a trained MLM 122 may be able to identify that the customer wishes to check on the status of a previously placed order, identify the name of the customer, the order number, and so on.

In some embodiments, multiple MLMs may be trained, simultaneously or separately. A speech identification pipeline may involve multiple models, e.g., an acoustic model for sound processing, such as parsing speech into words, a language model for recognition of parsed words, a model for intent identification, a model for understanding a question, or any other models. In some embodiments, some of the models may be trained independently while other models may be trained concurrently. For example, the acoustic model may be trained separately from all other models of language processing, intent identification model may be trained together with a speech transcription model, and so on.

In some embodiments, each or some of MLMs 122 (and/or MLMs 125) may be implemented as deep learning neural networks having multiple levels of linear or non-linear operations. For example, each or some of speech recognition MLMs may be convolutional neural networks, recurrent neural networks (RNN), fully connected neural networks, and so on. In some embodiments, each or some of MLMs 122 (and/or MLMs 125) may include multiple neurons wherein each neuron may receive its input from other neurons or from an external source and may produce an output by applying an activation function to the sum of (trainable) weighted inputs and a bias value. In some embodiments, each or some of MLMs 122 (and/or 125) may include multiple neurons arranged in layers, including an input layer, one or more hidden layers, and an output layer. Neurons from adjacent layers may be connected by weighted edges. Initially, edge weights may be assigned some starting (e.g., random) values. For every training input 165, training engine 160 may cause each or some of MLMs 122 (and/or MLMs 125) to generate output(s). Training engine 137 may then compare observed output(s) with the desired target output(s) 167. The resulting error or mismatch, e.g., the difference between the desired target output(s) 167 and the actual output(s) of the neural networks, may be back-propagated through the respective neural networks, and the weights in the neural networks may be adjusted to make the actual outputs closer to the target outputs 167. This adjustment may be repeated until the output error for a given training input 165 satisfies a predetermined condition (e.g., falls below a predetermined value). Subsequently, a different training input 165 may be selected, a new output generated, and a new series of adjustments implemented, until the respective neural networks are trained to an acceptable degree of accuracy.

Training engine 120 may include additional (compared with training engine 160) components to implement retraining of previously trained MLMs 122 for domain-specific applications. For example, training engine 120 may include a data augmentation module, to augment existing training data (e.g., training inputs 165) with domain-specific data. For example, an existing sound recordings may be augmented with target words and phrases that are commonly encountered in the target domain. For example, the data augmentation module may augment existing training inputs with utterances of phrases "short sale," "capital gain tax,"

"hedge fund," "economic fundamentals," "initial public offering," and so on. Target outputs 167 may similarly be augmented. For example, the data augmentation module may update target outputs 167 with various terms of art, such as "options," "futures," that have domain-specific meaning. Training engine 120 may additionally have a pruning module to reduce the number of nodes and an evaluation module to determine whether the pruning of nodes has not reduced the accuracy of the retrained model below a minimum threshold accuracy.

Figures 2A, 2B:
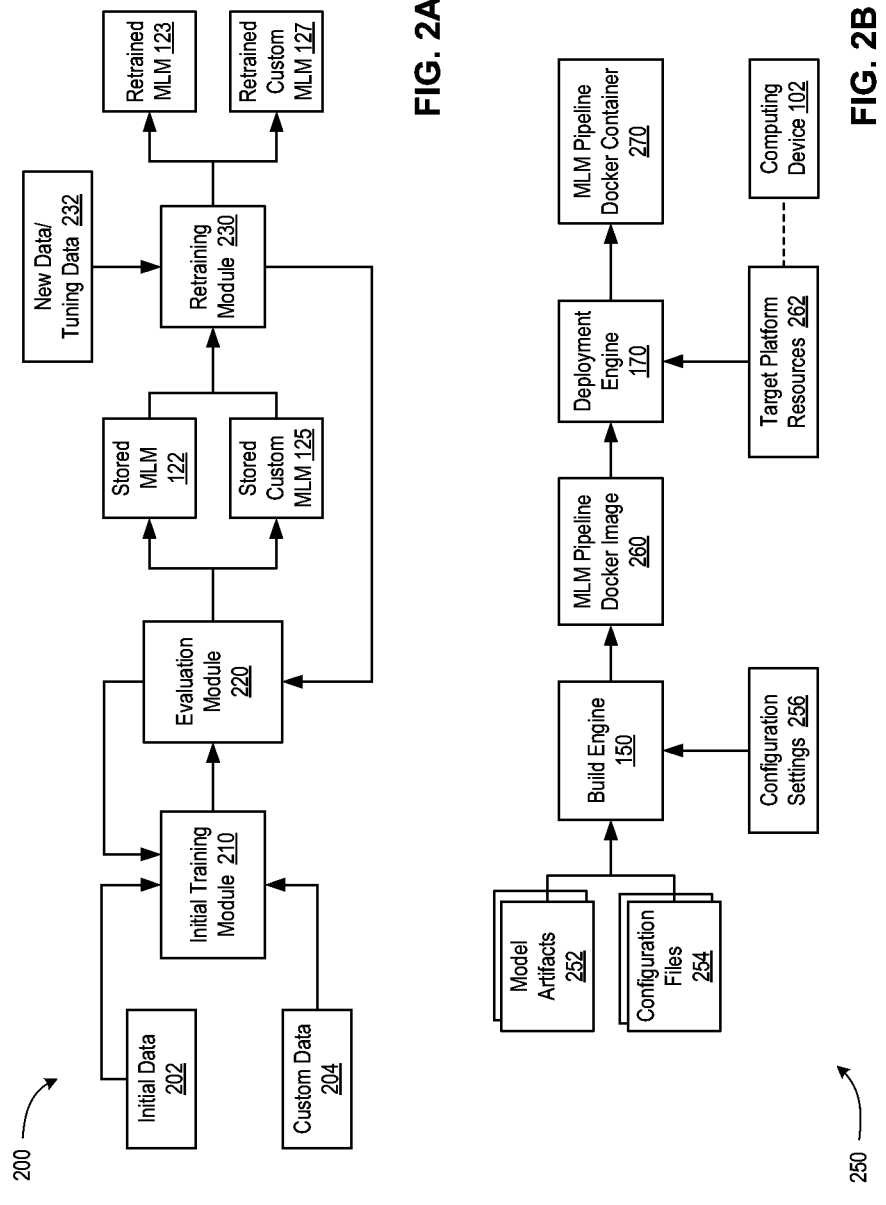
FIG. 2A is a block diagram of an example architecture of a training engine of the customizable pipeline of FIG. 1, in accordance with at least some embodiments.
FIG. 2B is a block diagram of an example architecture of a build-and-deploy stage of the customizable pipeline of FIG. 1, in accordance with at least some embodiments.

FIG. 2A is a block diagram of an example architecture 200 of a training engine (e.g., training engine 120) of the customizable pipeline 100 of FIG. 1, in accordance with at least some embodiments. As depicted in FIG. 2A, training engine architecture 200 may include a number of modules (sub-engines), such as initial training module 210, evaluation module 210, retraining module 230, etc., that perform operations described above. For example, initial training module 210 may train MLMs 122 using initial data 202. Initial training module 210 may also train custom MLMs 125 using custom (user-specific and/or user-provided) data 204. Evaluation module 220 may determine if training of MLMs 122 (or custom MLMs 125) has been successful or if additional training is to be performed. For example, evaluation module 220 may use a portion of initial data 202 (or custom data 204) that was reserved for testing/evaluation. If the respective MLM does not meet a minimum accuracy or confidence level, initial training module 210, as depicted with the back arrow, may provide additional training of the MLM. Once the MLM passes evaluation successfully, the MLM may be stored (e.g., in trained model repository 124 of FIG. 1) for immediate or future use by the user. Retraining module 230 may perform retraining of stored MLMs using new data/tuning data 232 to produce retrained MLMs 123 or retrained custom MLMs 127. For example, previously trained MLMs may be retrained for applications in a different domain. Alternatively, previously trained MLMs may be retrained to account for changed or additional conditions, e.g., a change in a terminology being used in the domain, hiring of a new employee whose speech characteristics differ from those of other employees, and the like. Retraining may similarly be performed until evaluation criteria are met (e.g., as determined by evaluation module 220). Retraining criteria may be different from initial training criteria.

Referring back to FIG. 1, during MLM retraining, the user may interact with pipeline orchestrator 110 via pipeline API 106 to monitor the retraining process. For example, at the beginning (or at any other stage) of retraining, the user may select a first set of pre-trained MLMs 122 as models that are to be used "as-is" without retraining. The user may further select a second set of pre-trained MLMs 122 for retraining by training engine 120 (or training engine 160) to produce retrained MLMs 123. Additionally, the user may cause training engine 120 (or training engine 160) to produce custom (user-trained) MLMs 125. The user may select, via UI 104, architecture and network parameters for custom MLMs 125; training engine 120 (or training engine 160) may receive the user-specified parameters via pipeline orchestrator 110 and perform training of custom MLMs 125 according to the received parameters. Parameters of pre-trained MLMs 122, retrained MLMs 123, and/or custom MLMs 125 may be stored in a memory device accessible to pipeline orchestrator 110. The memory device storing MLMs may be a local (e.g., non-volatile) memory on computing device 102 or a remote (e.g., cloud-based) memory accessible by computing device 102 via network 140. The user of CP 100 may be provided with listings of some or all available, to the user, MLMs (e.g., MLMs 122, 123, and/or 125) upon the user logging in/authenticating to the user's session of CP 100. The user-accessible listings may include MLMs retrained (123) or user-trained (125) during the current session as well as MLMs retrained or user-trained during any of the previous user sessions. Accordingly, during or after each user session, new user-trained custom MLMs 125 may be stored in trained model repository 124 for future use.

CP 100 may further include an export engine 130. Export engine 130 may allow the user to select any number of pre-trained MLMs 122, retrained MLMs 123, or custom MLMs 125 for subsequent deployment during the current (or future) user sessions. Export engine may export the user-selected MLMs using an implementation-independent format. In some embodiments, exporting the MLMs may include identifying and retrieving a topology of the MLMs, the number and types of neural network layers of the MLMs, the values of the weights determined during training performed by the training engine. In such embodiments, export engine 130 may generate a representation of the user-selected MLMs and cause the generated representation to be displayed on UI 104. The displayed representation may include graphs, tables, numerals, text entries, and other objects characterizing architecture of the selected MLMs, such as the number of layers, nodes, edges, topology of each selected MLM, and the like. The displayed representation may further include parameters of the selected MLMs, such as weights, biases, activation functions for various nodes, and the like. Metadata loaded by export engine 130 may also indicate what additional components and modules may be needed for deployment of the user-selected MLM. In speed recognition, such additional components may include a spectral analyzer of the sound of speech, a speech feature extractor for acoustic model, an acoustic post-processing component that removes speech artifacts, filler and stop words, a language pre-processing component that performs word tokenization, lemmatization, etc., a language post-processing component that performs rule-based correction/verification of language MLM outputs, and other components.

CP 100 may further include a build engine 150. Build engine 150 may allow the user to configure exported pre-trained MLMs 122, retrained MLMs 123, or custom MLMs 125 prior to deployment on the user platform. The representations of the exported MLMs provided by export engine 130 inform the user about the architecture and properties of the MLMs. The representations may indicate to the user which aspects of the MLMs are static (parameters) and which aspects (settings) are customizable. For example, the type of a neural network (e.g., convolutional vs. fully-connected), a number of the neuron layers in the neural network, the topology of the edges connecting nodes in the network, the types of the activation functions used in various nodes, and so on, may be fixed parameters. If the user wishes to change some of the fixed parameters, the user may have to use training engine 120 to retrain the respective neural network model for the new architecture. On the other hand, the user may be able to change settings of a MLM without retraining the model. Such configurable settings may include a chunk size, e.g., the size of an audio buffer to be processed in a streaming speech recognition application, alphabet to be used for mapping the outputs (e.g., Latin, Cyrillic, etc.), language (e.g., English, German, Russian, etc.), a window size for FFT processing of input voice data, a window overlap (e.g., 25%, 50%, 75%, etc.), Hamming window parameters, end-of-utterance detection parameters, audio buffer size, latency settings, and so on. Build engine 150 may also allow the user to select from available domains (e.g., financial industry domain, medical field domain, etc.) for which the selected MLMs have been trained (during initial training, retraining, or training on user-specific data). Build engine 150 (or pipeline orchestrator 110) may cause display of the settings of exported MLMs on UI 104 together with parameters of the exported MLMs. The display may be annotated with indications which modifications (of settings) should be handled by build engine 150 and which modifications (of parameters or settings) should be handled by training engine 120. For example, modifications that invoke changes to a language model may be handled by build engine 150 (without invoking training engine 120), whereas modifications that invoke changes to an acoustic model, e.g., audio data processing during a speech recognition decoder stage, may be handled by training engine 120. In some embodiments, modifications that invoke changes to a language model may include, without limitation, adjusting the weights of one or more layers in a model. As a further example, modification of settings between models, such as from an acoustic model of one language trained using voice data of adults to an acoustic model of the same language but trained using voice data from children may trigger invocation of training engine 120 and retraining of the acoustic model with new data.

Some settings may be related to a single exported MLM, e.g., alphabet (phonetic spelling or standard English spelling) settings may affect the language model but not affect the acoustic model. Some settings may be related to multiple MLMs, e.g., configuring the language model for Chinese speech recognition may also invoke change (e.g., automatic or default) in the settings of the acoustic model, in order to adjust for different cadence and tones of speech. Some settings may affect interaction of one or more MLMs with various pre- and post-processing components of the pipeline. For example, changing settings of the language model for use of the model for speech recognition in a different linguistic domain may also require modification of settings of a pre-processing block that eliminates stop words. Specifically, a language model that is to perform speech recognition of a formal presentation at a professional conference may use less aggressive stop/filler word removal than transcription of an informal brainstorming business meeting.

FIG. 2B is a block diagram of an example architecture 200 of a build-and-deploy stage of customizable pipeline 100 of FIG. 1, in accordance with at least some embodiments. Whereas build engine 150 allows the user to configure exported MLMs prior to deployment, deployment (deploy) engine 170 performs an actual implementation of CP 100 on the user-accessible platform. As depicted in FIG. 2B, MLMs exported by export engine 130 may have various model artifacts 252 (e.g., modules, dependencies, metadata, etc.) and one or more configuration files 254 that configure actual execution of exported MLMs. The user may input modified configuration settings 256 (e.g., received through UI 104 of FIG. 1), which may then be processed by build engine 150. Modified configuration settings may be written back into configuration file(s) 254, with various fields, e.g., default fields, originally provided by training engine 120, overwritten with the user-specified settings. Build engine 150 may process configuration file(s) 254 and model artifacts 252 (e.g., source codes, libraries, and other dependencies) for the exported MLMs and may produce executable artifacts for the exported MLMs, configurations files and various other dependencies, such as libraries, executable codes for pre- and post-processing components of the pipeline, and the like. The output of build engine 150 may be an intermediate representation (IR) of the pipeline. In some embodiments, the IR of the MLM pipeline may be packaged as a docker image 260, or an image for any similar platform for containerized application execution. In some implementations, an image in a different (other than docker) format may be used, e.g. any proprietary format may be used. In some implementations, an appropriate archive of a format that bundles various executable components, libraries, data, and metadata together may be used. The content of the IR may be stored in a memory device (e.g., as an archive) of a computing device of the user, e.g., computing device 102, or in a memory device accessible to computing device 102 (e.g., on cloud). Build engine 150 may be a tool or an application implemented in Python language, in C++ language, in the Java language, or in any other programming language.

Deployment engine 170 of the configurable pipeline (e.g., CP 100 of FIG. 1) may implement the pipeline on user-accessible hardware resources (the target platform). The user may have access to (e.g., local) computing device 102 having a number of CPUs, GPUs, and memory devices. Alternatively or additionally, the user may have access to one or more cloud computing servers providing virtualization services. Deployment engine 170 may allow the user to input the description or identification of the user-accessible target platform resources 262 which may include identification of available computational, memory, network, etc., resources. In some embodiments, deployment engine 170 may collect information about local resources of computing device 102 using any available metric collection devices or drivers. Alternatively or additionally, deployment engine 170 or pipeline orchestrator 110 may collect information (e.g., using a remote access server or an authentication service of a remote virtualization server) about available virtual (cloud) processing resources. Collected information may include (but not be limited to) CPU speed, the number of CPU cores (physical or virtual), the number and type of GPUs (physical or virtual), an amount of available system memory and/or GPU memory, a number of remote processing nodes available for the pipeline deployment, type and version of the operating system installed on computing device 102 (or type/version of guest operating system instantiated on the virtualized environment), and the like. Deployment engine 170 enables execution of the MLM pipeline (e.g., CP 100) on user-accessible computing resources without reconfiguring the functional character of the MLM pipeline after user-selected configuration settings have been implemented by build engine 150.

In some embodiments, deployment engine 170 may access the IR of the MLM pipeline stored (locally or in a cloud) by build engine 150 and generate an inference ensemble of executable codes (e.g., implemented in object code or byte code), configuration files, libraries, dependencies, and other resources produced for use by an inference engine 180. In embodiments where the IR of the MLM pipeline is a docker (or similar) image 260, deployment engine 170 may instantiate a pipeline docker container 270 that is based on docker image 260, e.g., using a containerization service of the user-accessible target platform. In some embodiments, the inference ensemble may be a Triton ensemble for Triton Inference Server that facilitates deployment of MLMs and allows the user to run MLMs using various available frameworks (e.g., TensorFlow, TersorRT, PyTorch, ONNX Runtime, etc.) or a custom user-provided framework. Deployment engine 170 may execute commands specified in the IR to run executable codes, libraries, and other dependencies generated by build engine 150. Furthermore, deployment engine 170 may perform mapping of the MLM pipeline configuration generated by build engine 150 for processing on the specific target platform's computing resources, including available GPUs and/or CPUs. Configuration files generated by deployment engine 170 may be stored using platform-neutral protocol buffers, which may be ASCII-serialized. The use of protocol buffers enables to minimize typographical and serialization-related errors that may otherwise occur when the user (developer) adds support for the MLM architecture.

Referring again to FIG. 1, after deployment engine 170 converts the IR into the inference ensemble ready for execution by inference engine 180 (e.g., into the pipeline docker container), the MLM pipeline may be ready for processing input user data 182. User data 182 may be any data to which the configured MLM pipeline may be applied. For example, for speech processing, user data 182 may include speech recording, e.g., digital recording of a conversation, presentation, narration, or any other sound recording that is to be transcribed. In some embodiments, user data may include a question (or a series of questions) that are to be answered. In some embodiments, user data 182 may be an image (or a sequence of images) with objects to be identified, patterns of motion to be detected, and so on. Any other user data 182 may be input into inference engine 180, with the type of user data that depends on the user-specific domain. In embodiments that involve natural language processing, user-specific domains may include customer service support, medical questioning, an educational environment, a courtroom environment, an emergency personnel conversation, or any other type of environment.

Inference engine 180 may process user data 182 and generate inference output 184. Inference output 184 may have any appropriate type and format. For example, inference output 184 may be a transcription of a speech or a conversation, an identification of an intent or emotion of the speaker(s), an answer to a question (e.g., in a textual or numerical form), and so on. The format of inference output 184 may be that of a text, a number, a numerical spreadsheet, audio file, a video file, or any combination thereof.

Various engines of CP 100 need not be applied in a linear progression. In some embodiments, various engines of CP 100 may be applied multiple times. For example, user data 182 may be used as testing data and the obtained inference output 184 may be used as feedback about the current state of the pipeline. The feedback may inform the user about how to modify the pipeline to improve its performance. In some embodiments, such modification can be performed iteratively. For example, upon receiving the feedback, the user may initiate retraining of some of the MLMs included in the pipeline using training engine 120. The user may also replace some of the MLMs with other (e.g., pre-trained or user-trained) MLMs and export newly-added MLMs using export engine 130. The user may change configurations of some of the old, retrained, or newly trained MLMs using build engine 150. Build engine 150 may be configured to update (e.g., by generating an updated IR) model artifacts and configuration files only of those MLMs and components of the pipeline that have been modified (e.g., via updated configuration settings) without changing models and components that have remained unchanged, for faster installation. In some embodiments, such faster installation may be achieved with the use of PIP (Package Installation for Python) Wheel build-package format (.whl). Subsequently, deployment engine 170 may use the updated IR to deploy the updated pipeline on the target platform. In some embodiments, the user may keep the MLMs and their respective configuration settings, but modify (by increasing, decreasing, or otherwise modifying) the resources available on the target platform.

Figure 3:
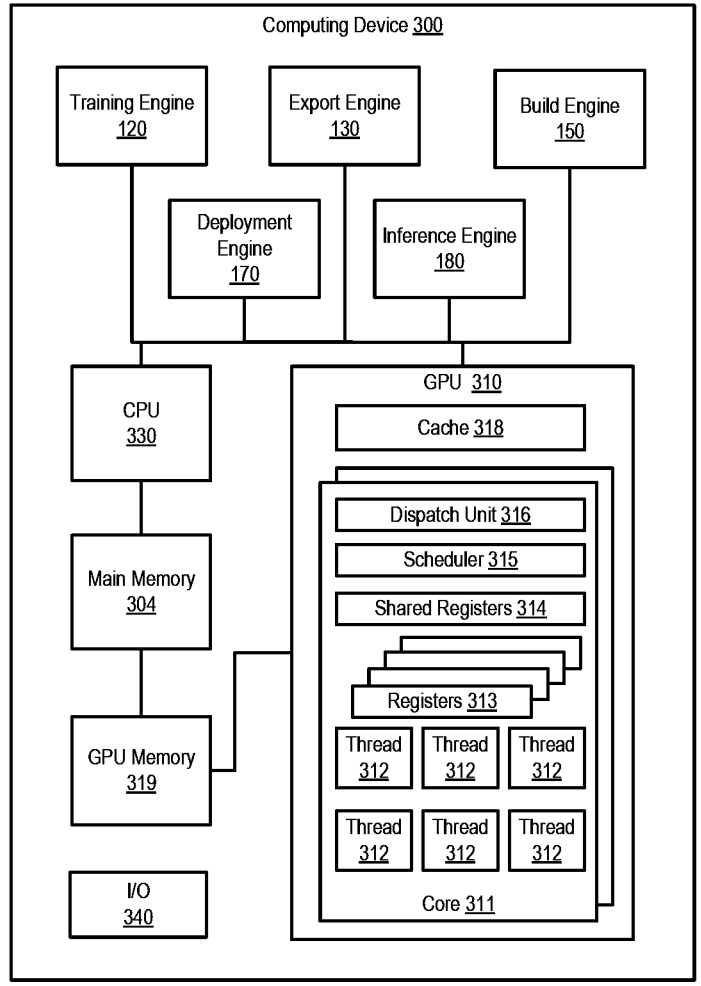
FIG. 3 is an example computing device capable of implementing a customizable pipeline that supports training, configuring, and deploying one or more machine learning models, in accordance with at least some embodiments.

FIG. 3 is an example computing device 300 capable of implementing a customizable pipeline that supports training, configuring, and deploying one or more machine learning models, in accordance with at least some embodiments. In some embodiments, computing device 300 may include some or all of the engines of the customizable pipeline, e.g., CP 100 of FIG. 1, including training engine 120, export engine 130, build engine 150, deployment engine 170, and inference engine 180. Although FIG. 3 depicts all engines as part of the same computing device, in some implementations any of the engines shown may in fact be implemented on different computing devices, including virtual computing devices, cloud-based processing devices, and the like. For example, computing device 300 may include inference engine 180 but not other engines of the customizable pipeline. Inference engine 180 (and/or any other engines of the pipeline) may be executed by one or more GPUs 310 to perform speech recognition, object recognition, or any other inferencing involving machine learning. In some embodiments, a GPU 310 includes multiple cores 311, each core being capable of executing multiple threads 312. Each core may run multiple threads 312 concurrently (e.g., in parallel). In some embodiments, threads 312 may have access to registers 313. Registers 313 may be thread-specific registers with access to a register restricted to a respective thread. Additionally, shared registers 314 may be accessed by all threads of the core. In some embodiments, each core 311 may include a scheduler 315 to distribute computational tasks and processes among different threads 312 of core 311. A dispatch unit 316 may implement scheduled tasks on appropriate threads using correct private registers 313 and shared registers 314. Computing device 300 may include input/output component(s) 334 to facilitate exchange of information with one or more users or developers.

In some embodiments, GPU 310 may have a (high-speed) cache 318, access to which may be shared by multiple cores 311. Furthermore, computing device 300 may include a GPU memory 319 where GPU 310 may store intermediate and/or final results (outputs) of various computations performed by GPU 310. After completion of a particular task, GPU 310 (or CPU 330) may move the output to (main) memory 304. In some embodiments, CPU 330 may execute processes that involve serial computational tasks (assigned by one of the engines of the pipeline) whereas GPU 310 may execute tasks (such as multiplication of inputs of a neural node by weights and adding biases) that are amenable to parallel processing. In some embodiments, a respective engine of the pipeline (e.g., build engine 150, inference engine 180, etc.) may determine which processes managed by the respective engine are to be executed on GPU 310 and which processes are to be executed on CPU 330. In some embodiments, CPU 330 may determine which processes are to be executed on GPU 310 and which processes are to be executed on CPU 330.

FIG. 4 is a block diagram of an example customizable pipeline 400 that uses one or more machine learning models for natural language processing of speech, in accordance with at least some embodiments. Some or all of the MLMs of pipeline 400 may be trained neural network models, e.g., pre-trained and/or custom trained deep learning neural networks. A speech input 402 into pipeline 400 may be an analog signal, e.g., generated by a microphone and converted into a digital file in any audio format readable by a processing device. Input speech 402 may undergo audio preprocessing 410, which may include spectral analysis and other processing. For example, input speech 402 may undergo filtering, upsampling or downsampling, pre-emphasis, windowing (e.g., using a 20 ms window that is advanced every 10 ms), applying the Mel Frequency Cepstral Coefficients (MFCC) algorithm, and/or other processing. Multidimensional vectors representing extracted features may be input into a first MLM 420, which may be an acoustic MLM (e.g., acoustic neural network model). Acoustic MLM 420 may be a neural network model trained to output identification of various phonemes (elemental sub-word sounds), each assigned a certain probability. Acoustic post-processing 430 may include speech decoding (e.g., assigning probabilities to various words), and may further include removing sound artifacts, filler or stop words, or some other types of acoustic post-processing. Language pre-processing 440 may include word stemming or lemmatization (determining root form of words), tokenization (identification of sequence of characters and words.), and the like. An output of language pre-processing 440 may be used as an input into a second MLM 450, which may include one or more language MLMs (e.g., language neural network models). Second MLM 450 may be another neural network trained to produce a text output 460, which may be a transcription of speech input 402. In some embodiments, second MLM 450 may be configured to produce punctuation detection (450-1), utterance detection (450-2), and detection of intent of the speaker (450-3), which may be implemented via additional outputs/neuron layers of the same second MLM 450 or as additional neural network models. Second MLM 450 may include a language understanding neural network model 450-4 and/or a question-answer (Q-A) neural network model 450-5. An output of Q-A model 450-5 may be a representation (e.g., a textual representation) of an answer to a question contained in speech input 402. In some embodiments, the output of Q-A model 450-5 may be provided to a speech synthesizer, which may be a third MLM 470 trained to output artificial speech as part of speech output 472.

As described above in relation to FIGS. 1 and 2, first MLM 420, second MLM 450, and/or third MLM 470 may be pre-trained or custom-trained by training engine 120, as depicted schematically with dashed arrows. In some embodiments, some or all of MLMs 420, 430, and 470 may be retrained using domain-specific user data. Additionally, as further depicted in FIG. 4, some or all of MLMs 420, 430, and 470 may be configured (without retraining) using build engine 150 and based on configuration settings provided by the user.

FIG. 5 and FIG. 6 are flow diagrams of example methods 500 and 600 respectively that are related to provisioning of customizable machine learning pipelines, in accordance with at least some embodiments. Methods 500 and 600 may be performed to deploy MLMs for use in voice recognition, speech recognition, speech synthesis, object detection, object recognition, motion detection, hazard detection, robotics applications, forecasting, and many other contexts and applications where machine learning may be used. In at least one embodiment, method 500 and method 600 may be performed by processing units of computing device 102, computing device 300, or some other computing device, or a combination of multiple computing devices. Methods 500 and 600 may be performed by one or more processing units (e.g., CPUs and/or GPUs), which may include (or communicate with) one or more memory devices. In at least one embodiment, method 500 and method 600 may be performed by multiple processing threads (e.g., CPU threads and/or GPU threads), each thread executing one or more individual functions, routines, subroutines, or operations of the method. In at least one embodiment, processing threads implementing method 500 (and, similarly, method 600) may be synchronized (e.g., using semaphores, critical sections, and/or other thread synchronization mechanisms). Alternatively, processing threads implementing method 500 (and, similarly, method 600) may be executed asynchronously with respect to each other. Various operations of methods 500 and 600 may be performed in a different order compared with the order shown in FIGS. 5 and 6. Some operations of the methods may be performed concurrently with other operations. In at least one embodiment, one or more operations shown in FIGS. 5 and 6 may not always be performed.

FIG. 5 is a flow diagram of an example method 500 of providing a customizable pipeline that support training, configuring, and deploying of one or more machine learning models, in accordance with at least some embodiments. The customizable pipeline may be CP 100, which may include various engines, modules, and components as described above in relation to FIGS. 1 and 2A-B. Processing units performing method 500 may access, at block 510, a plurality of trained MLMs, which may be pre-trained MLMs 122 (e.g., by the providers of the pipeline services) or custom (trained by a user of the pipeline) MLMs 125. The selected MLMs may be pre-trained using a first set of training data, which may be previously supplied by the providers of the pipeline services or by the user. Maintaining trained MLMs may include storing files and data sufficient for deployment and execution of the MLMs, or storing references to such files and data, e.g., links to the downloadable files and data stored elsewhere (such as on a cloud storage). Some or each of the maintained MLMs may be associated with initial configuration settings, which may be stored in configuration files, databases, etc. for the respective MLMs. The configuration settings may also be accessible by the processing units performing method 500. In some embodiments, at least some of the selected MLMs may be (or include) a neural network model having a plurality of neuron layers. Some of the neural network models may be deep learning neural network models.

At block 520, processing units performing method 500 may provide (to the user) a user interface (UI) to receive a user input indicative of a selection of one or more MLMs of the plurality of trained MLMs. For example, the user may be attempting to set up a machine learning pipeline and may select, from available MLMs, those MLMs that can solve a specific problem or a group of problems for the user. For example, the user attempting to set up a pipeline for speech recognition may select an acoustic model, for decoding an input speech, and a language model, for recognizing the decoded speech. To help with the selection of MLMs for the pipeline, prior to receiving the user selection of the one or more MLMs, the processing units may cause a display, on the UI, of one or more listings of the plurality of trained MLMs that may be available to the user. In some embodiments, the listings may be available in the form of enumerated items, clickable buttons, icons, menus, or any other prompts. The listings, for some or each of the listed MLMs, may include a representation of an architecture of the respective MLMs, which may be in a form of a graph, a table, a depiction of layers, a description of the topology of the MLMs, and so on. In some embodiments, the listings may further include parameters of the respective MLMs, such as a number of nodes, edges, activation functions, or any other specification of the properties of the MLMs.

In response to viewing the listings of the MLMs, the user may decide that some of the selected MLMs should be changed to better correspond to the specifics of the user's project. In some instances, a modification of the MLMs may be significant enough to require retraining of the selected MLMs, e.g., using a second training data, which may be user-selected data for retraining the selected MLMs for a particular domain in which the MLM pipeline is to be applied. In particular, the processing units performing method 500 may receive a second set of training data for a domain-specific training of the one or more selected MLMs. For example, the processing units may receive, based on the user input via UI, an indication of the MLMs that are to be retrained. For example, from the acoustic MLM and the language MLM selected for a speech recognition pipeline, the user may indicate that the language MLM is to be retrained for the Japanese language (having been previously trained for English). The user may also identify a location (e.g., a cloud storage address) where the retraining data (e.g., the second data) is located. The retraining data may include a training input (e.g., sound files), a target output (e.g., transcriptions of speech in the sound files), and mapping data (indications of the correspondence of the training inputs to the target outputs). Responsive to receiving the indications of the MLMs to be retrained and the retraining data, the processing units may cause execution of a training engine of the pipeline (e.g., training engine 120) to perform the domain-specific training of the one or more selected MLMs, as described in more detail above in conjunction with FIG. 1. Retraining may be performed on both pre-trained MLMs 122 and previously trained custom MLMs 125.

In some instances, a needed modification of the MLMs may not be so substantial as to require retraining. In some embodiments, the modified configuration settings may include language settings for the language neural network model. Using the previous example, to implement the change from the English language to the Japanese language, the user may decide to modify settings of the acoustic MLM, e.g., to change the size of the sliding window. In response to receiving the user input specifying how the initial configuration settings for the one or more MLMs are to be modified, at block 530, the processing units performing method 500 may determine modified configuration settings for the one or more selected MLMs based on the user input. In some embodiments, the modified configuration settings for the one or more selected MLMs may include an audio buffer size, end-of-utterance settings, or latency settings for the acoustic MLM. Other natural language processing MLMs that may similarly be configured include a speech synthesis MLM, a language understanding MLM, a question answering MLM, or any other MLM.

At block 540, the processing units performing method 500 may cause (e.g., by issuing an instruction to initiate) execution of a build engine of the MLM pipeline to modify the one or more selected MLMs in accordance with the modified configuration settings, as described in more detail above in conjunction with FIG. 1. At block 550, the method may continue with the processing units causing execution of a deployment engine of the pipeline to deploy the one or more modified MLMs, as described in more detail above in conjunction with FIG. 1. At block 560, the processing units performing method 500 may cause display, on the UI, of a representation of the one or more deployed MLMs, as described in more detail above in conjunction with FIG. 1. The displayed representation may indicate to the user that the deployed MLMs are ready to process user data. The configurable MLM pipeline may be used for training, deployment, and inference with any number of machine learning models of any type.

FIG. 6 is a flow diagram of an example method 600 of using a deployed customizable machine pipeline machine learning models, in accordance with at least some embodiments. In some embodiments, method 600 may be used in conjunction with method 500. Method 600 may be performed after providing the listings of pre-trained MLMs 122 and custom MLMs 125 for presentation to the user and, optionally, after retraining of MLMs selected by the user for retraining by the training engine. At block 610, the processing units performing method 600 may receive the user selection of the one or more MLMs (to be placed in the configurable pipeline) and may cause execution of an export engine of the pipeline to initialize the one or more selected MLMs. At block 620, method 600 may continue with making (e.g., using the export engine) the one or more selected MLMs available to process a user input data. Additionally, method 600 may include causing execution of build engine (block 540) and deployment engine (block 560), as described in relation to method 500 of FIG. 5.

At block 630, the processing units performing method 600 may receive the user input data and, at block 640, may cause (e.g., using inference engine) the one or more deployed MLMs to be applied to the user input data to generate an output data. An output of application of the one or more MLMs may cause display, at block 650, on the UI, of at least one of a representation of the output data or a reference to a stored representation of the output data. For example, if the user input data includes speech, the representation of the output data may be a text with the transcription of the input speech, an identification of the intent of the speaker, a punctuation of the input speech, a sound response (e.g., using a synthesized voice) to a question asked, and so on. In some embodiments, representation of the output data may be a text or a sound presented directly to the user, e.g., on the UI. In some embodiments, the representation of the output data may be an indication where the output data is stored (on a local machine or on a cloud).

Inference and Training Logic

Figure 7A:
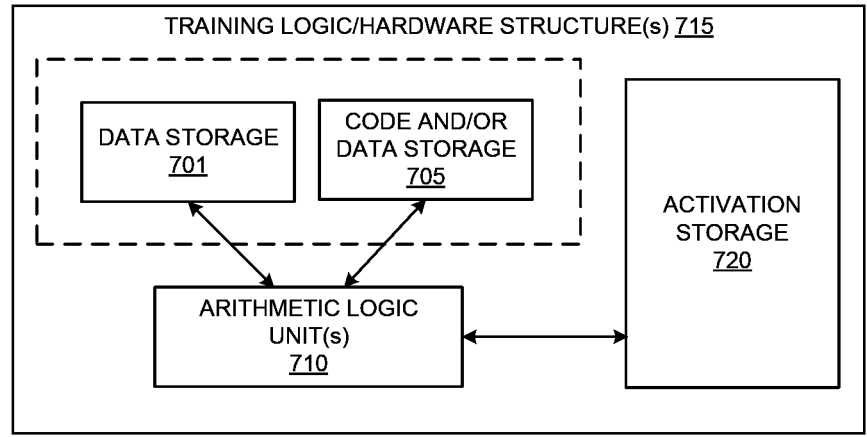
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware, data processing unit ("DPU") hardware, or other hardware, such as field programmable gate arrays ("FPGAs").

Figure 7B:
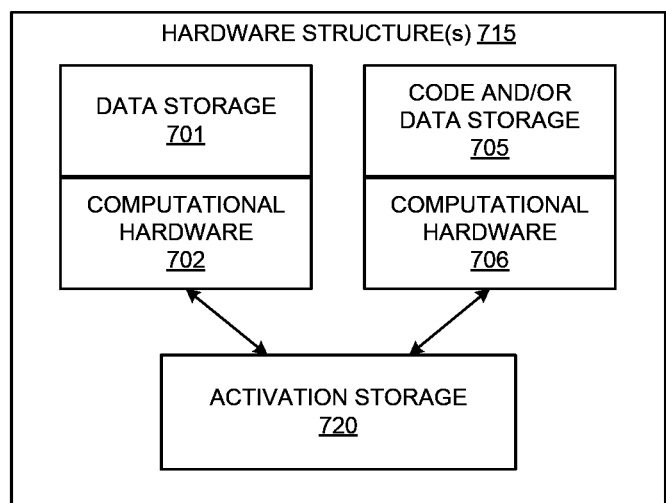
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware, data processing unit (DPU) hardware, or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 105 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
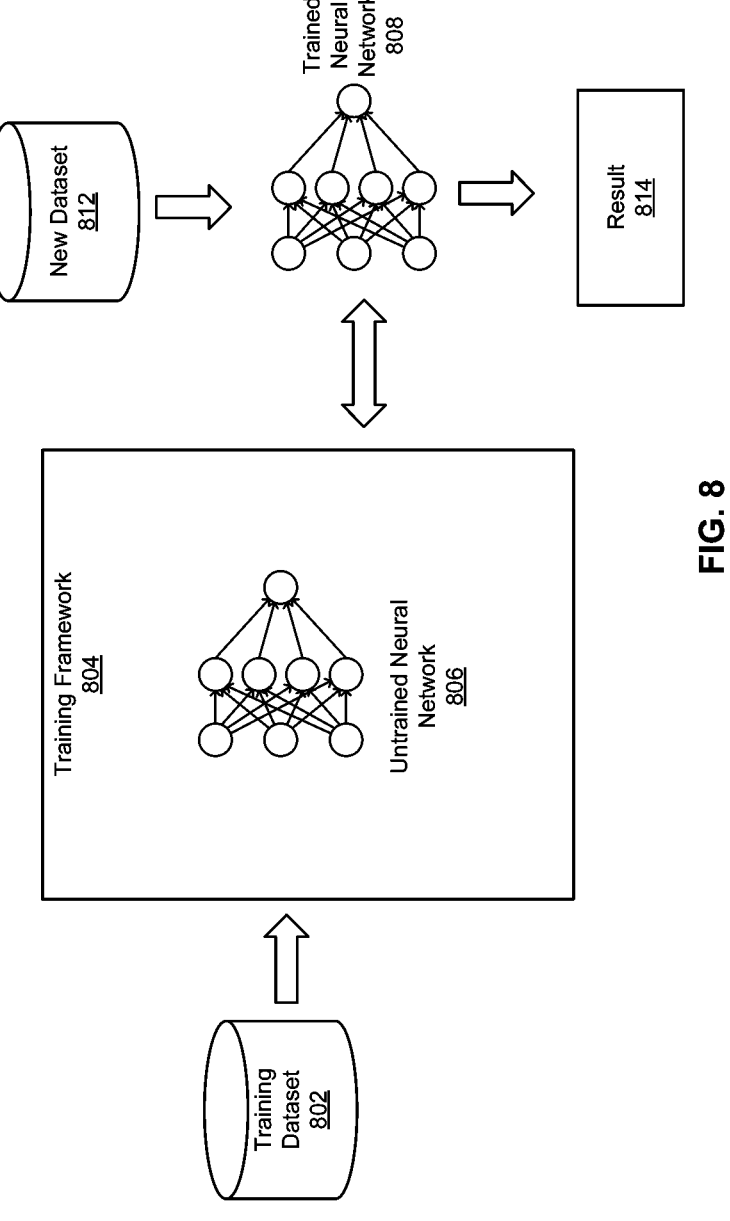
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
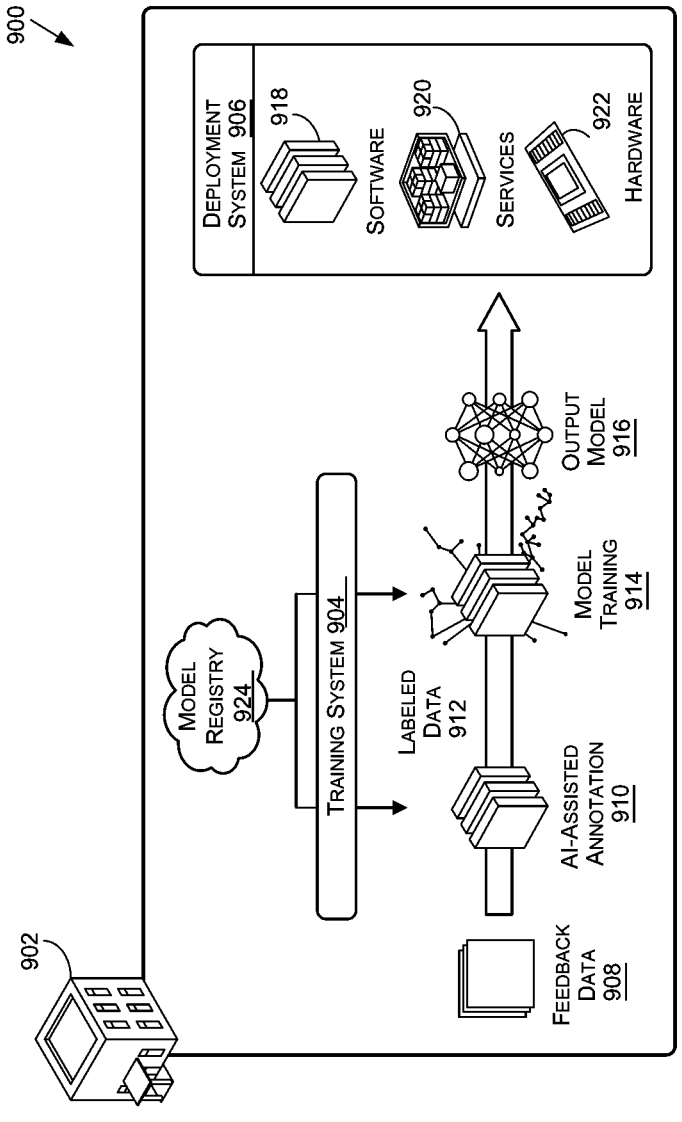
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some of applications used in advanced processing and inferencing pipelines may use machine learning models or other AI to perform one or more processing steps. In at least one embodiment, machine learning models may be trained at facility 902 using feedback data 908 (such as feedback data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo preprocessing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
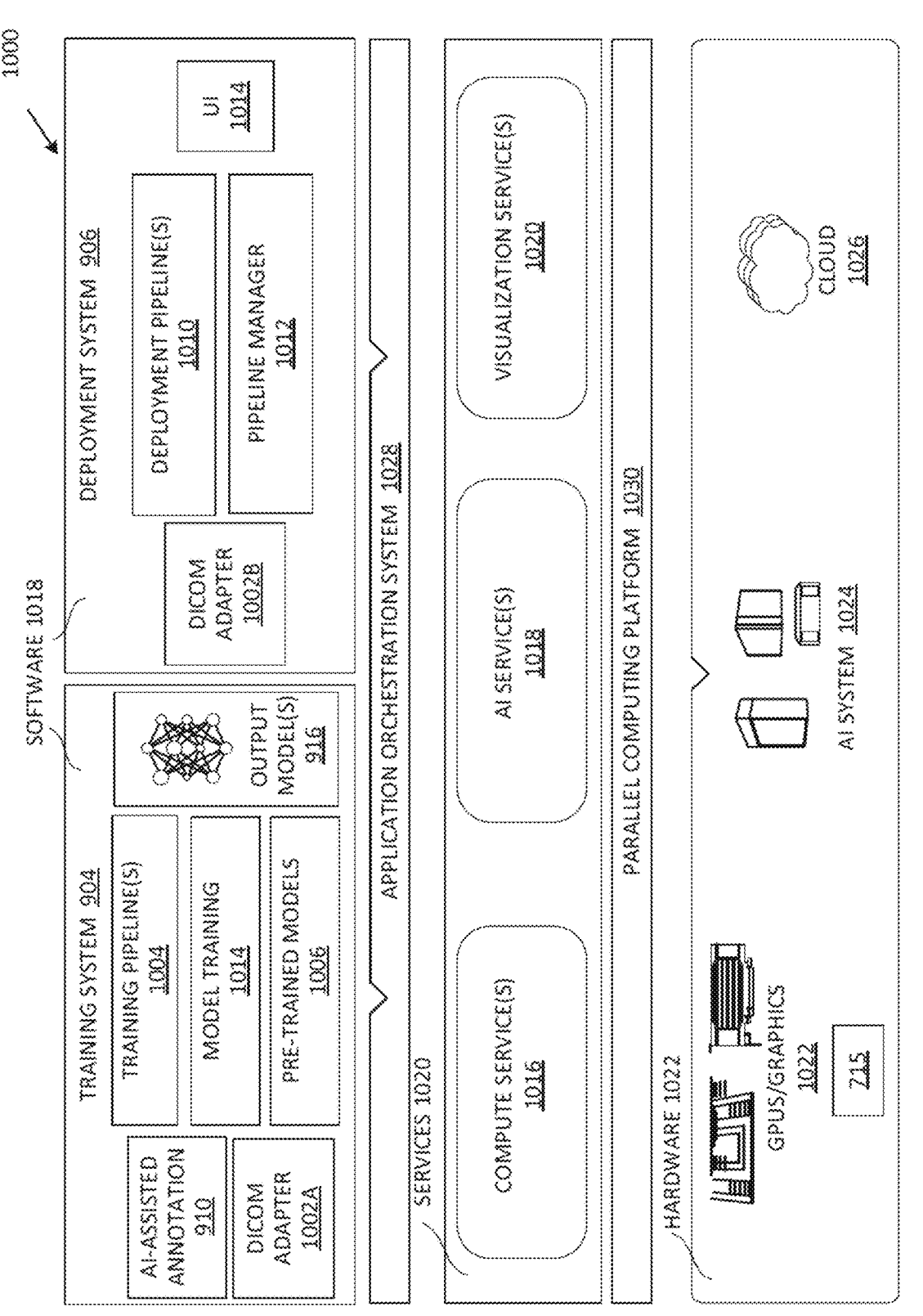
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity—who provides an inference or image processing request—may browse a container registry and/or model registry 924 for an application, container, dataset, machine learning model, etc., select a desired combination of elements for inclusion in data processing pipeline, and submit an processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel (e.g., using a parallel computing platform 1030 (FIG. 10)). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon a same inference service to perform one or more inferencing tasks.

In at least one embodiment, hardware 922 may include GPUs, CPUs, DPUs, graphics cards, an AI/deep learning system (e.g., an AI supercomputer, such as NVIDIA's DGX supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, as non-limiting examples. In at least one embodiment, at least some of computing environment of deployment system 906 and/or training system 904 may be executed in a datacenter one or more supercomputers or high performance computing systems, with GPU optimized software (e.g., hardware and software combination of NVIDIA's DGX system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 3006) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public IPs that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004 similar to a first example described with respect to FIG. 9 may be used for a first machine learning model, training pipeline 1004 similar to a second example described with respect to FIG. 9 may be used for a second machine learning model, and training pipeline 1004 similar to a third example described with respect to FIG. 9 may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment or embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s) (e.g., facility 902). In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types)—including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface 1014 (e.g., a graphical user interface, a web interface, etc.) that may be used to select applications for inclusion in deployment pipeline(s) 1010, arrange applications, modify or change applications or parameters or constructs thereof, use and interact with deployment pipeline(s) 1010 during set-up and/or deployment, and/or to otherwise interact with deployment system 906. In at least one embodiment, although not illustrated with respect to training system 904, user interface 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged by and shared by applications or containers in deployment system 906 may include compute services 1016, AI services 1018, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA and/or QUADRO GPUs) may include any number of GPUs that may be used for executing processing tasks of compute services 1016, AI services 1018, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TENSOR®), provide an accelerated parallel computing API and platform 1030 (e.g., NVIDIA's CUDA), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry—such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

At least one embodiment of the disclosure can be described in view of the following clauses:

In clause 1, a method to deploy a customized machine learning model (MLM), the method comprising: accessing a plurality of trained MLMs each associated with initial configuration settings; providing a user interface (UI) to receive a user input indicative of a selection of one or more MLMs of the plurality of trained MLMs and a modification to initial configuration settings for the one or more MLMs; determining modified configuration settings for the one or more selected MLMs based on the user input; causing execution of a build engine to modify the one or more selected MLMs in accordance with the modified configuration settings; causing execution of a deployment engine of to deploy the one or more modified MLMs; and causing display, on the UI, of a representation of the one or more deployed MLMs.

In clause 2, the method of clause 1, wherein the one or more selected MLMs are pre-trained using a first set of training data.

In clause 3, the method of clause 2, further comprising: receiving a second set of training data for a domain-specific training of the one or more selected MLMs; and causing execution of a training engine of the pipeline to perform the domain-specific training of the one or more selected MLMs.

In clause 4, the method of clause 1, further comprising: prior to receiving the user input indicative of a selection of the one or more MLMs, causing display, on the UI, of a listing of the plurality of trained MLMs; and after receiving the user input indicative of a selection of the one or more MLMs, causing execution of an export engine to initialize the one or more selected MLMs.

In clause 5, the method of clause 4, wherein causing execution of the export engine further comprises: causing display, on the UI, of a representation of at least one of an architecture of the one or more selected MLMs or parameters of the one or more selected MLMs.

In clause 6, the method of clause 4, wherein causing execution of the export engine further comprises: making the one or more selected MLMs available to process a user input data.

In clause 7, the method of clause 6, further comprising: receiving the user input data; causing the one or more deployed MLMs to be applied to the user input data to generate an output data; and causing display, on the UI, at least one of a representation of the output data or a reference to a stored representation of the output data.

In clause 8, the method of clause 1, wherein the one or more selected MLMs comprise a neural network model arranged in a pipeline.

In clause 9, the method of clause 1, wherein the one or more selected MLMs comprise an acoustic neural network model and a language neural network model.

In clause 10, the method of clause 9, wherein the modified configuration settings for the one or more selected MLMs comprise at least one of: an audio buffer size of an acoustic pre-processing stage for the acoustic neural network model; end-of-utterance settings for the acoustic neural network model; latency settings for the acoustic neural network model; or language settings for the language neural network model.

In clause 11, the method of clause 8, wherein the one or more selected MLMs comprise at least one of a speech synthesis neural network model, a language understanding neural network model, or a question answering neural network model.

In clause 12, the system comprising: a memory device; and one or more processing devices, communicatively coupled to the memory device, to: access a plurality of trained machine learning models (MLMs) each associated with initial configuration settings; provide a user interface (UI) to receive a user input indicative of a selection of one or more MLMs of the plurality of trained MLMs and a modification of initial configuration settings for the one or more MLMs; determine modified configuration settings for the one or more selected MLMs based on the user input; cause execution of a build engine of a pipeline to modify the one or more selected MLMs in accordance with the modified configuration settings; cause execution of a deployment engine of the pipeline to deploy the one or more modified MLMs; and cause display, on the UI, of a representation of the one or more deployed MLMs.

In clause 13, the system of clause 12, wherein the one or more processing devices are further to: prior to receiving the user input indicative of a selection of the one or more MLMs, cause display, on the UI, of a listing of the plurality of trained MLMs; and after receiving the user input indicative of a selection of the one or more MLMs, cause execution of an export engine of the pipeline to initialize the one or more selected MLMs.

In clause 14, the system of clause 13, wherein to cause execution of the export engine, the one or more processing devices are further to: cause display, on the UI, of a representation of at least one of an architecture of the one or more selected MLMs or parameters of the one or more selected MLMs.

In clause 15, the system of clause 12, wherein the one or more processing devices are further to: receive a user input data; cause the one or more deployed MLMs to be applied to the user input data to generate an output data; and cause display, on the UI, at least one of a representation of the output data or a reference to a stored representation of the output data.

In clause 16, the system of clause 12, wherein the modified configuration settings for the one or more selected MLMs comprise at least one of: an audio buffer size of an acoustic pre-processing stage for an acoustic neural network model; end-of-utterance settings for the acoustic neural network model; latency settings for the acoustic neural network model; or language settings for a language neural network model.

In clause 17, the system of clause 12, wherein the one or more selected MLMs comprise at least one of a speech synthesis neural network model, a language understanding neural network model, or a question answering neural network model.

In clause 18, a non-transitory computer-readable medium storing instructions thereon, wherein the instructions, when executed by a processing device, cause the processing device to: access a plurality of trained machine learning models (MLMs) each associated with initial configuration settings; provide a user interface (UI) to receive a user input indicative of a selection of one or more MLMs of the plurality of trained MLMs and a modification of initial configuration settings for the one or more MLMs; determine modified configuration settings for the one or more selected MLMs based on the user input; cause execution of a build engine of a pipeline to modify the one or more selected MLMs in accordance with the modified configuration settings; cause execution of a deployment engine of the pipeline to deploy the one or more modified MLMs; and cause display, on the UI, of a representation of the one or more deployed MLMs.

In clause 19, the computer-readable medium of clause computer-readable medium of claim 18, wherein the instructions are further to cause the processing device to: prior to receiving the user input indicative of a selection of the one or more MLMs, cause display, on the UI, of a listing of the plurality of trained MLMs; and after receiving the user input indicative of a selection of the one or more MLMs, cause execution of an export engine of the pipeline to initialize the one or more selected MLMs.

In clause 20, the computer-readable medium of clause 19, wherein to cause execution of the export engine, the instructions are further to cause the processing device to: cause display, on the UI, of a representation of at least one of an architecture of the one or more selected MLMs or parameters of the one or more selected MLMs.

In clause 21, the computer-readable medium of clause 18, wherein the instructions are further to cause the processing device to: receive a user input data; cause the one or more deployed MLMs to be applied to the user data to generate an output data; and cause display, on the UI, at least one of a representation of the output data or a reference to a stored representation of the output data.

In clause 22, the computer-readable medium of clause 20, wherein the modified configuration settings for the one or more selected MLMs comprise at least one of: an audio buffer size of an acoustic pre-processing stage for an acoustic neural network model; end-of-utterance settings for the acoustic neural network model; latency settings for the acoustic neural network model; or language settings for a language neural network model.

In clause 23, the computer-readable medium of clause 20, wherein the one or more selected MLMs comprise at least one of a speech synthesis neural network model, a language understanding neural network model, or a question answering neural network model.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU")—potentially in conjunction with a GPU—executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method to deploy a customized machine learning model (MLM), the method comprising:
   causing execution of a build engine to:
      modify one or more selected MLMs from a plurality of trained MLMs in accordance with one or more updated configuration files, each updated configuration file corresponding to at least one respective selected MLM from the one or more selected MLMs and comprising at least one modification to an initial set of configuration settings for that at least one respective selected MLM; and
      configure, using the one or more updated configuration files, an image container for execution of the one or more modified MLMs; and
   causing execution of a deployment engine to:
   collect metrics for one or more processing units available to deploy the one or more modified MLMs, wherein the metrics comprise at least one of:
      a number of the available processing units,
      a clock speed of the available processing units, or
      an amount of memory accessible to the available processing units;
   generate, based on the collected metrics and the image container, an execution container comprising one or more executable codes for execution of the one or more selected MLMs in accordance with the one or more
updated configuration files; and
deploy, using the generated execution container, the one
or more selected MLMs on the one or more processing
units; and
causing display, on a user interface (UI), of a representation of the one or more deployed MLMs.
2. The method of claim 1, wherein the one or more
selected MLMs are pre-trained using a first set of training
data.
3. The method of claim 2, further comprising:
receiving a second set of training data for a domain-specific training of the one or more selected MLMs;
and
causing execution of a training engine to perform the
domain-specific training of the one or more selected
MLMs.
4. The method of claim 1, wherein the one or more
selected MLMs are selected via user input through the UI
and indicative of the selection of the one or more MLMs,
and further comprising:
prior to receiving the user input indicative of a selection
of the one or more MLMs, causing display, on the UI,
of a listing of the plurality of trained MLMs; and
after receiving the user input indicative of a selection of
the one or more MLMs, causing execution of an export
engine to initialize the one or more selected MLMs.
5. The method of claim 4, wherein causing execution of
the export engine further comprises:
causing display, on the UI, of a representation of at least
one of an architecture of the one or more selected
MLMs or parameters of the one or more selected
MLMs.
6. The method of claim 4, wherein causing execution of
the export engine further comprises:
making the one or more selected MLMs available to
process user input data.
7. The method of claim 6, further comprising:
receiving the user input data;
causing the one or more deployed MLMs to be applied to
the user input data to generate output data; and
causing display, on the UI, at least one of a representation
of the output data or a reference to a stored representation of the output data.
8. The method of claim 1, wherein the one or more
selected MLMs comprise a neural network model arranged
in a pipeline.
9. The method of claim 1, wherein the one or more
selected MLMs comprise an acoustic neural network model
and a language neural network model.
10. The method of claim 9, wherein the modified configuration settings for the one or more selected MLMs
comprise at least one of:
an audio buffer size of an acoustic pre-processing stage
for the acoustic neural network model;
end-of-utterance settings for the acoustic neural network
model;
latency settings for the acoustic neural network model; or
language settings for the language neural network model.
11. The method of claim 8, wherein the one or more
selected MLMs comprise at least one of a speech synthesis
neural network model, a language understanding neural
network model, or a question answering neural network
model.

12. A system comprising:
a memory device; and
one or more processing devices, communicatively
coupled to the memory device, to:
cause execution of a build engine of a pipeline to:
modify one or more selected MLMs from a plurality of
trained MLMs in accordance with one or more
updated configuration files, each updated configuration file corresponding to at least one respective
selected MLM from the one or more selected MLMs
and comprising at least one modification to an initial
set of configuration settings for that at least one
respective selected MLM; and
configure, using the one or more updated configuration
files, an image container for execution of the one or
more modified MLMs; and
cause execution of a deployment engine of the pipeline to:
collect metrics for one or more processing units available to deploy the one or more modified MLMs,
wherein the metrics comprise at least one of:
a number of the available processing units,
a clock speed of the available processing units, or
an amount of memory accessible to the available
processing units;
generate, based on the collected metrics and the image
container, an execution container comprising one or
more executable codes for execution of the one or more
selected MLMs in accordance with the one or more
updated configuration files; and
deploy, using the generated execution container, the one
or more selected MLMs on the one or more processing
units; and
cause display, on a user interface (UI), of a representation
of the one or more deployed MLMs.
13. The system of claim 12, wherein the one or more
selected MLMs are selected via user input through the UI
and indicative of the selection of the one or more MLMs,
and the one or more processing devices are further to:
prior to receiving the user input indicative of a selection
of the one or more MLMs, cause display, on the UI, of
a listing of the plurality of trained MLMs; and
after receiving the user input indicative of a selection of
the one or more MLMs, cause execution of an export
engine of the pipeline to initialize the one or more
selected MLMs.
14. The system of claim 13, wherein to cause execution of
the export engine, the one or more processing devices are
further to:
cause display, on the UI, of a representation of at least one
of an architecture of the one or more selected MLMs or
parameters of the one or more selected MLMs.
15. The system of claim 12, wherein the one or more
processing devices are further to:
receive user input data;
cause the one or more deployed MLMs to be applied to
the user input data to generate output data; and
cause display, on the UI, at least one of a representation
of the output data or a reference to a stored representation of the output data.
16. The system of claim 12, wherein the initial configuration settings for the one or more selected MLMs comprise
at least one of:
an audio buffer size of an acoustic pre-processing stage
for an acoustic neural network model;
end-of-utterance settings for the acoustic neural network
model;
latency settings for the acoustic neural network model; or
language settings for a language neural network model.

17. The system of claim 12, wherein the one or more selected MLMs comprise at least one of a speech synthesis neural network model, a language understanding neural network model, or a question answering neural network model.

18. A non-transitory computer-readable medium storing instructions thereon, wherein the instructions, when executed by a processing device, cause the processing device to:

cause execution of a build engine of a pipeline to:

modify one or more selected MLMs from a plurality of trained MLMs in accordance with one or more updated configuration files, each updated configuration file corresponding to at least one respective selected MLM from the one or more selected MLMs and comprising at least one modification to an initial set of configuration settings for that at least one respective selected MLM; and configure, using the one or more updated configuration files, an image container for execution of the one or more modified MLMs; and cause execution of a deployment engine of the pipeline to:

collect metrics for one or more processing units available to deploy the one or more modified MLMs, wherein the metrics comprise at least one of:

a number of the available processing units, a clock speed of the available processing units, or an amount of memory accessible to the available processing units;

generate, based on the collected metrics and the image container, an execution container comprising one or more executable codes for execution of the one or more selected MLMs in accordance with the one or more updated configuration files; and deploy, using the generated execution container, the one or more selected MLMs on the one or more processing units; and cause display, on a user interface (UI), of a representation of the one or more deployed MLMs.

19. The computer-readable medium of claim 18, wherein the one or more selected MLMs are selected via user input through the UI and indicative of the selection of the one or more MLMs, and the instructions are further to cause the processing device to:

prior to receiving the user input indicative of a selection of the one or more MLMs, cause display, on the UI, of a listing of the plurality of trained MLMs; and after receiving the user input indicative of a selection of the one or more MLMs, cause execution of an export engine of the pipeline to initialize the one or more selected MLMs.

20. The computer-readable medium of claim 19, wherein to cause execution of the export engine, the instructions are further to cause the processing device to:

cause display, on the UI, of a representation of at least one of an architecture of the one or more selected MLMs or parameters of the one or more selected MLMs.

21. The computer-readable medium of claim 18, wherein the instructions are further to cause the processing device to:

receive user input data;

cause the one or more deployed MLMs to be applied to the user input data to generate output data; and cause display, on the UI, at least one of a representation of the output data or a reference to a stored representation of the output data.

22. The computer-readable medium of claim 20, wherein the initial configuration settings for the one or more selected MLMs comprise at least one of:

an audio buffer size of an acoustic pre-processing stage for an acoustic neural network model;

end-of-utterance settings for the acoustic neural network model;

latency settings for the acoustic neural network model; or language settings for a language neural network model.

23. The computer-readable medium of claim 20, wherein the one or more selected MLMs comprise at least one of a speech synthesis neural network model, a language understanding neural network model, or a question answering neural network model.

* * * * *